United States Patent

[11] 3,582,878

[72] Inventors Douglas C. Bossen
Wappingers Falls, N.Y.;
Robert T. Chien, Urbana, Ill.; Mu-Yue Hsiao, Poughkeepsie; Frederick F. Sellers, Jr., Hopewell Junction, N.Y.

[21] Appl. No. 789,724
[22] Filed Jan. 8, 1969
[45] Patented June 1, 1971
[73] Assignee International Business Machines Corporation
Armonk, N.Y.
by said Bossen, said Hsiao, and said Sellers

[54] MULTIPLE RANDOM ERROR CORRECTING SYSTEM
12 Claims, 7 Drawing Figs.

[52] U.S. Cl. .......... 340/146.1
[51] Int. Cl. .......... H04l 1/10, G08c 25/00
[50] Field of Search .......... 340/146.1; 307/211, 216; 235/153

[56] References Cited

UNITED STATES PATENTS

| | | | |
|---|---|---|---|
| 2,978,678 | 4/1961 | Winger et al. | 340/146.1UX |
| 3,037,697 | 6/1962 | Kahn | 235/153 |
| 3,164,804 | 1/1965 | Burton et al. | 340/146.1 |
| 3,183,483 | 5/1965 | Lisowski | 340/146.1 |
| 3,200,374 | 8/1965 | Ballard | 340/146.1 |
| 3,222,644 | 12/1965 | Burton et al. | 340/146.1 |
| 3,234,510 | 1/1966 | Scott | 340/146.1 |
| 3,369,184 | 2/1968 | Zonis | 307/216X |
| 3,404,373 | 10/1968 | Srinivasan | 340/146.1 |
| 3,439,332 | 4/1969 | Cook | 340/146.1 |

OTHER REFERENCES

Calingaert, P. Two-Dimensional Parity Checking. In "J. Assoc. for Comput. Mach." 8(2): p. 186— 200. April 1961. QA 76.A8j.

Sacks, G. E. Multiple Error Correction by Means of Parity Checks . In "IRE Trans. Inf. Theory" IT4 (4): p. 445— 447. December 1958 Q350.I2

Wilcox, R. H. et al. ed. Redundancy Techniques for Computing Systems. Wash. D.C., Spartan, 1962. p. 185—187, by W. H. Kautz, Codes and Coding Circuitry . TK7888.3.59.

*Primary Examiner*—Malcolm A. Morrison
*Assistant Examiner*—R. Stephen Dildine, Jr.
*Attorney*—Sughrue, Rothwell, Mion, Zinn & MacPeak

ABSTRACT: The error correcting system is capable of correcting multiple random errors in data messages of $k \leq m^2$ data bits where $m$ is an integer. The message is encoded by adding $2m$ check bits for each additional error correcting capability. The encoded message after data transfer and storage is decoded by parity checking and threshold logic decision circuits. The parity checking circuits are constructed in modular form. Each additional module adds a further error correcting capability. The outputs from each module form inputs to the threshold logic decision circuit where the error correction is made. Detection of an additional error can be simply achieved by an overall parity circuit.

INVENTORS
DOUGLAS C. BOSSEN
ROBERT T. CHIEN
MU-YUE HSIAO
FREDERICK F. SELLERS, JR.

BY [signature]
ATTORNEY

MULTIPLE RANDOM ERROR CORRECTING SYSTEM

This invention relates generally to error correction, and more particularly, to multiple random error correction for parallel data.

The coding concept for correcting errors in data messages was first set forth in RE23601 (U.S. Pat. No. 2,552,629) "Error Detecting and Correcting Systems" by R. W. Hamming et al. These coding arrangements have generally become known as Hamming Codes. These codes require that a minimum number of check bits or parity bits be added to the message bits thus producing a coded message which can be decoded in such a way as to correct errors introduced during storage or transmission. Due to recent developments, multiple errors can also be corrected in cyclic codes using circuitry of reasonable complexity. However, these arrangements normally require significant time delays in decoding. (See Berlekamp, E. R., Algebraic Coding Theory, 1968, McGraw Hill).

Ordinarily, error correcting codes have parity check arrangements which are strictly a function of the number of errors to be corrected and the number of data bits. In order to increase the error correcting capability of a specific code, a new design is generally required. The present invention provides a parity check circuit arrangement constructed in modular form such that each module in conjunction with the associated check bits will add an additional error correcting capability.

An object of this invention is to provide a new and improved multiple error correcting system. The invention is applicable to data transmission and storage and especially to parallel data processing systems such as digital computer memories, data paths and other important paths that require a high degree of protection against introduction of errors. With the reduced cost and increased speed made available by the development of integrated circuits, the addition of error correcting systems in a computer has become practical.

A simple form of error detection in a memory or other data processing apparatus can be provided by duplicative storage locations for each bit. An error that occurs in only one position can be detected as a mismatch between corresponding bits of the word. If three or more positions are provided for each bit, it is possible to correct errors; if an error occurs in only one position, the correct value can be recognized from the two valid bits for the same position. To generalize, when a bit is produced an odd number of times, errors that occur in one fewer than half the number of bits can be detected by accepting the majority value which is correct. Of course, when more than half of the bits are incorrect, the error will be uncorrected.

All error correcting systems use the concept of generating redundant data bits; however, the arrangement of simply transmitting the same bit over and over is seldom used because more efficient systems have been devised. These systems are called codes because the original data bits are encoded to generate a longer word (which will be called a message) in which some of the bits are functions of several data bits. The information of each data bit appears as functions of several of the message bits. The message is decoded to form data bits in a way in which an error in one bit of the message can be detected or corrected from information in other message bits.

Error correcting codes are commonly identified by three numbers that can be generalized as $(n, k, t)$. These terms define, respectively, the number of message bits, the number of data bits, and the number of errors that can be corrected in each message block. For example, in the (45,25,2) code that will be described, a message of 45-bit positions represents 25 data bits, and errors in any two of the 45 message bits can be corrected. Many error correcting codes can be explained in terms of the well-known parity check circuit which detects but does not correct errors. In a parity check system an extra bit is added to the data word to signify whether there is an odd number (or an even number) of 1's in the data word.

In our invention, parity check circuitry is used to generate the check bits and to regenerate the data bits for decoding. For example, the following check bit equation can be generated in the encoding:

$$c_k = d_i \oplus d_j$$

In the decoding process, this equation is translated as follows:

$$d_i = c_k \oplus d_j$$

where $c_k$=$k$th check bit
$d_i$=$i$th data bit
$d_j$=$j$th data bit
$\oplus$ = EXCLUSIVE OR function The procedure utilized in decoding and error correction is to generate $2t$ independent copies of $d_i$ by translating certain of the check bit equations where the word independent implies that the $2t$ equations used to generate the $2t$ copies of $d_i$ contain no other data or check bits in common. These $2t$ copies of $d_i$ plus the original $d_i$ itself are fed into a majority circuit to correct 0 up to $t$ errors.

An object of the present invention is to provide a coding system for parallel data in a data processing system and a decoding arrangement for the encoded data which, together, automatically correct errors introduced into the data.

Another object of the present invention is to provide encoding and decoding apparatus which operate with ultra high speed and which can be constructed so that each successive error correcting capability can be added using a modular construction technique.

A further object of the present invention is to provide a new class of error correcting codes.

It is another object of the present invention to provide a new class of error correcting codes which are capable of correcting $t$ random errors of data length $k$ with no more than $2mt$ check bits where $m^2$ is greater or equal to $k$ and $m$ is an integer.

It is a further object of the present invention to provide an error correction system capable of correcting errors introduced in the decoding circuitry.

It is another object of the present invention to provide a method for encoding and decoding a message having $m^2$ data bits.

Briefly, a multiple random error correction system is provided for correcting messages of $k \leq m^2$ data bits in a parallel data processing system where $m$ is an integer. The system includes encoding means for adding $2m$ check bits to the data bits for each additional error correcting capability. The decoding means includes a threshold logic circuit for each of the data bits and a parity checking logic circuit. The parity checking circuit is constructed in modular form such that each additional module along with the additional $2m$ check bits adds an additional error correcting capability. The outputs from each module form inputs to the threshold logic circuit where the error correction is made.

The foregoing and other objects, features and advantages of the invention will be apparent from the following more particular description of preferred embodiments of the invention, as illustrated in the accompanying drawings.

Figure 1:
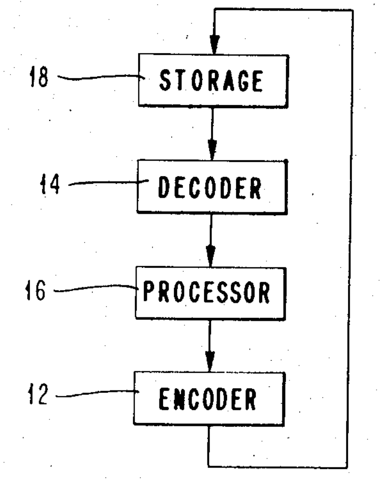
FIG. 1 is a block diagram of a data processing system including an error correcting system.

Referring to FIG. 1, there is shown a typical block diagram of the encoder 12 and decoder 14 in a data processing system. The data is generated in the processor 16 and encoded at the output thereof before it is placed in storage 18. When the information is to be utilized again, it is decoded to correct any errors that were introduced in transmission to or from storage or while in storage.

The codes included in the present invention are those having a data length of $k \leq m^2$ where $m$ is any integer greater than 1. If it is desired to encode a message of data bits which does not have a data length equal to a perfect square, then a Latin square code of length equal to the next greatest square is utilized to generate the check bit (or parity) equations. Subsequently, the code can be shortened to the required data length. In the following description, the construction procedure is first illustrated for Latin square codes of length $m^2$. A Latin square of side $m$ is an arrangement of $m$ digits into $m^2$ subsquares of a square in such a way that every row and every column contains every digit exactly once.

Considering the single error correction case, which is the simplest, the $m^2$ data bits represented by the symbols $d_0$, $d_1$,... $d_{k11}$ are arranged in a square array of the following form:

| | $c_{m+1}$ | $c_{m+2}$ | $c_{m+3}\ldots$ | $c_{2m}$ |
|---|---|---|---|---|
| $c_1$ | $d_0$ | $d_1$ | $d_2\ldots$ | $d_{m-1}$ |
| $c_2$ | $d_m$ | $d_{m+1}$ | $d_{m+2}\ldots$ | $d_{2m-1}$ |
| $c_3$ | $d_{2m}$ | $d_{2m+1}$ | $d_{2m+2}\ldots$ | $d_{3m-1}$ |
| . | . | . | . | . |
| . | . | . | . | . |
| $c_m$ | $d_{(m-1)m}$ | $d_{(m-1)m+1}$ | $d_{(m-1)m+2}\ldots$ | $d_{m^2-1}$ |

[1]

The rows of this array are consecutively labeled with $c_1$, $c_2$,... $c_m$ and the columns with $c_{m+1}$, $c_{m+2}$,...$c_{2m}$. Thus, the equation for check bit $c_i$, $i$ equal to 1, 2,...$2m$, is equal to the EXCLUSIVE OR of the data bits which appears in its row and likewise with respect to the columns in the array. That is:

$$\left.\begin{array}{lllllll} c_1= & d_0 & \oplus & d_1 & \oplus\, d_2 & \oplus\ \ldots & \oplus\, d_{m-1} \\ c_2= & d_m & \oplus & d_{m+1} & \oplus\, d_{m+2} & \oplus\ \ldots & \oplus\, d_{2m-1} \\ \cdot & \cdot & \cdot & \cdot & \cdot & \cdot & \cdot \\ c_m= & d_{(m-1)m} & \oplus & d_{(m-1)m+1} & \oplus\, d_{(m-1)m+2} & \oplus\ \ldots & \oplus\, d_{m^2-1} \end{array}\right\}\text{Row equations.}$$

$$\left.\begin{array}{lllllll} c_{m+1}= & d_0 & \oplus & d_m & \oplus\, d_{2m} & \oplus\ \ldots & \oplus\, d_{(m-1)m} \\ c_{m+2}= & d_1 & \oplus & d_{m+1} & \oplus\, d_{2m+1} & \oplus\ \ldots & \oplus\, d_{(m-1)m+1} \\ \cdot & \cdot & \cdot & \cdot & \cdot & \cdot & \cdot \\ c_{2m}= & d_{m-1} & \oplus & d_{2m-1} & \oplus\, d_{3m-1} & \oplus\ \ldots & \oplus\, d_{m^2-1} \end{array}\right\}\text{Column equations.}$$

It can be seen that each data bit appears in exactly two of these $2m$ check bit equations. Also, the two equations which contain a common data bit do not contain any other data bits in common. These two observations are key factors in forming the code. For example $d_0$ appears in the equation for $c_1$ and $c_{m+1}$. It will be appreciated that each one of these equations $c_1$....2m can be simply implemented by performing the functions indicated in the equations. That is, each data bit in an equation is sent to an EXCLUSIVE OR circuit. The output of the EXCLUSIVE OR circuit will be the corresponding check bit $c_1$...$c_o$. This forms the basis for the encoding process. To understand the decoding process we notice that the equations $c_1$ and $c_{m+1}$ for example, can be rewritten as:

$$d_0 = c_1 \oplus d_1 \oplus d_2 \oplus \ldots \oplus d_{m-1}$$

$$d_0 = c_{m+1} \oplus d_m \oplus d_{2m} \oplus \ldots \oplus d_{(m-1)m}$$

It will be appreciated that no common variable remains in these two equations for $d_0$. Thus, the presence of a single error in the data or check bits $d_0$, $d_1$,..., $d_{k11}$, $c_1$, $c_2$,...$c_{2m}$ can affect at most one of these two equations. Therefore, $d_0$ is correctly given by the function:

$$d_0 = \text{Maj}\ (d_0,\ c_1 \oplus d_1 \oplus d_2 \oplus \ldots \oplus d_{m-1},\ c_{m+1} \oplus d_m \oplus d_{2m} \oplus \ldots \oplus d_{(m-1)m}$$

This last equation is the majority voting equation for the majority voting decoding of the data $d_0$. A similar determination can be made for each data bit which was encoded.

Figure 4:
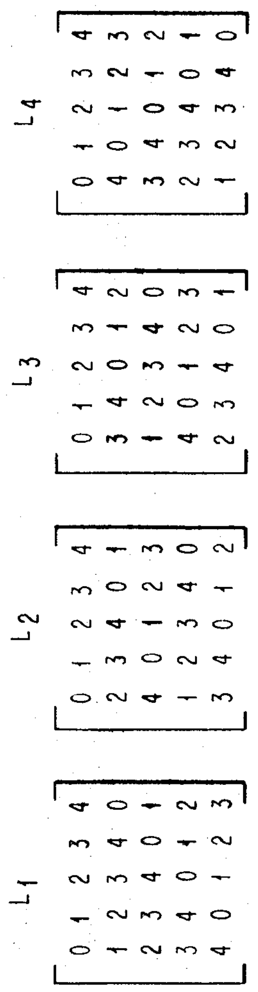
FIG. 4 shows the set of four orthogonal Latin squares for five digits.

The basic theory for single error correction can be extended to the multiple error correction by "building" onto the set of check bit equations for single error correction. This "building" extends also to the mechanization or implementation of the decoding circuitry. The additional check bit equations are generated in accordance with orthogonal Latin square theory. The resulting equations have the property that each data bit appears in exactly $2t$ check bit equations where $t$ is the number of errors the code is capable of correcting. These $2t$ equations containing a common data bit contain no other common data bit. A Latin square of order (size) $m$ is an $m$X$m$ square array of the digits 0,1,...,$m-1$ such that each row and each column are a permutation of the digits 0,1,...,$m-1$. A Latin square is used to generate the set of $m$ check bit equations by superimposing the Latin square on the $m$X$m$ array of information bits given in equation [1]. This can be considered as a mask on the data bits. The data bits which are "covered" by the same digits in the Latin square are EXCLUSIVE OR'ed together to produce the check bit equation. This yields $m$ check bit equations. If $L_1$ and $L_2$ shown in FIG. 4 are orthogonal Latin squares, then the set of $2m$ check bit equations produced in the above manner from $L_1$ and $L_2$ will have the same property as the row and column equations for the single error correction case. This property is that any two equations containing a common bit contains no other common bit, and, therefore, can be added to the row and column equations for the single error correction case. Thus, each data bit appears in four check bit equations, and no other common data bit appears in these four equations, and therefore a three out of five majority voting arrangement can be used to correct all double errors. In general, we can use a set of $p$ (where $p$ is equal to ($m-1$ if $m$ is a power of a prime number) orthogonal Latin squares to generate additional $mp$ check bit equations, which when added to the $2m$ row and column equations, yield $m(p+2)$ parity check equations. The resultant code can correct $p/2+1=t$ errors using $t+1$ out of $2t+1$ voting (or majority gates). The modularity construction of the decoder is deduced from the "building" concept. When one goes from $t$ error corrections to $t+1$ error corrections, it is only necessary to add $2m$ check bit equations to the set already existing for the $t$ error corrections. These additional equations are obtained from two additional orthogonal Latin squares. The theory of orthogonal Latin squares is well known. For example, see C. B. Mann, "Analysis and Design of Experiments," Dover Publications, Inc., New York, 1949. There are limits on the maximum number of orthogonal Latin squares of a given order (size). This is a function of $m$, the size of the Latin square.

The following is a specific application of the foregoing theory to a square code with $5^2=25$ data bits. Thus, $m=5$ and there are four orthogonal Latin squares of order 5 as shown in FIG. 4. R, the number of check bits, is equal to $2mt$, where $t$ equals the number of errors to be corrected. Thus, in the case of a single error correcting code $2mt$ equals 10. The data bits $d_0$ through $d_{24}$, as previously set forth, are arranged in a square array as follows:

| | $c_6$ | $c_7$ | $c_8$ | $c_9$ | $c_{10}$ |
|---|---|---|---|---|---|
| $c_1$ | $d_0$ | $d_1$ | $d_2$ | $d_3$ | $d_4$ |
| $c_2$ | $d_5$ | $d_6$ | $d_7$ | $d_8$ | $d_9$ |
| $c_3$ | $d_{10}$ | $d_{11}$ | $d_{12}$ | $d_{13}$ | $d_{14}$ |
| $c_4$ | $d_{15}$ | $d_{16}$ | $d_{17}$ | $d_{18}$ | $d_{19}$ |
| $c_5$ | $d_{20}$ | $d_{21}$ | $d_{22}$ | $d_{23}$ | $d_{24}$ |

By EXCLUSIVE O-ring together the data in the $c_1$—$c_5$ rows and the data in the corresponding columns $c_6$—$c_{10}$, the following equation for the check bits $c_1$...$c$can be written:

$$\left.\begin{array}{l} c_1=d_0\oplus d_1\oplus d_2\oplus d_3\oplus d_4 \\ c_2=d_5\oplus d_6\oplus d_7\oplus d_8\oplus d_9 \\ c_3=d_{10}\oplus \omega_{11}\oplus d_{12}\oplus d_{13}\oplus d_{14} \\ c_4=d_{15}\oplus d_{16}\oplus d_{17}\oplus d_{18}\oplus d_{19} \\ c_5=d_{20}\oplus d_{21}\oplus d_{22}\oplus d_{23}\oplus d_{24} \end{array}\right\}\text{Row equations.}$$

$$\left.\begin{array}{l} c_6=d_0\oplus d_5\oplus d_{10}\oplus d_{15}\oplus d_{20} \\ c_7=d_1\oplus d_6\oplus d_{11}\oplus d_{16}\oplus d_{21} \\ c_8=d_2\oplus d_7\oplus d_{12}\oplus d_{17}\oplus d_{22} \\ c_9=d_3\oplus d_8\oplus d_{13}\oplus d_{18}\oplus d_{23} \\ c_{10}=d_4\oplus d_9\oplus d_{14}\oplus d_{19}\oplus d_{24} \end{array}\right\}\text{Column equations.}$$

Figure 2:
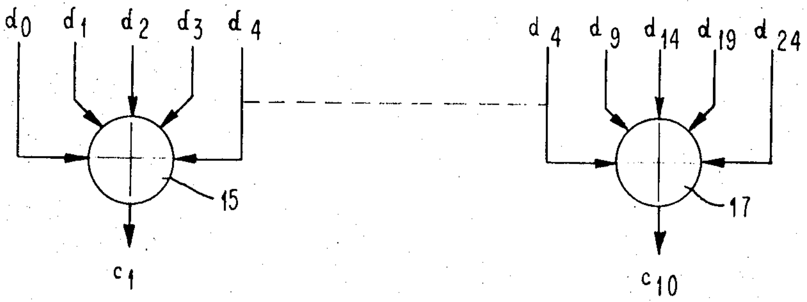
FIG. 2 is a schematic diagram of an encoder for deriving the necessary check bits.
Figure 3:
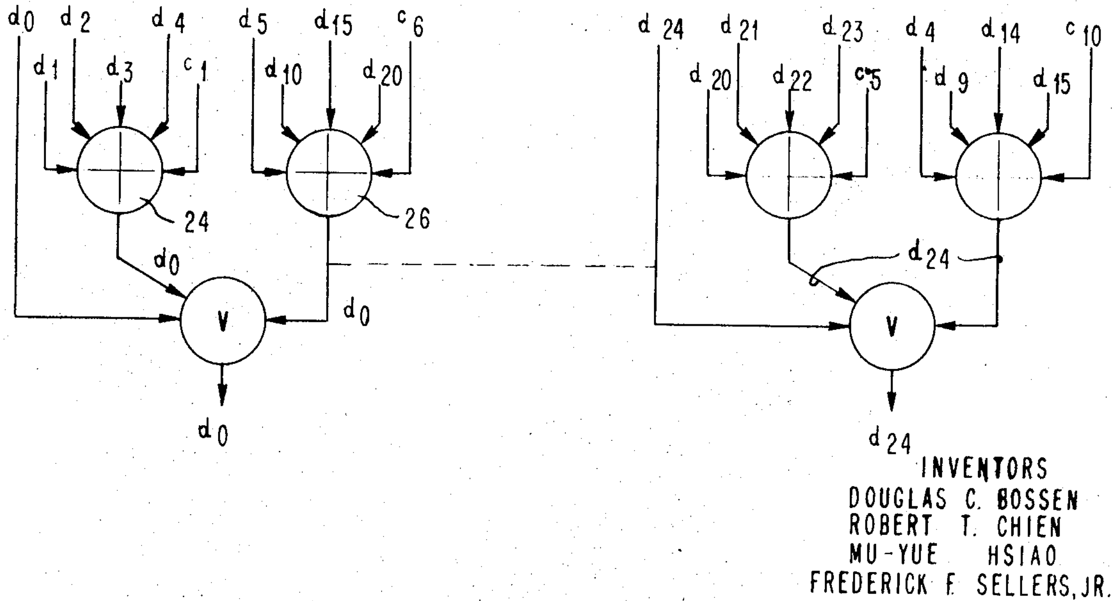
FIG. 3 is a schematic diagram of a decoder for the encoded message from the circuit of FIG. 2.

The encoder for the 10 check bit equations can be implemented using the five input EXCLUSIVE OR gates represented by 15,17 in FIG. 2. Of course, these five input EXCLUSIVE OR gates may be implemented in many different ways. The straightforward implementation shown in many textbooks is with AND and OR gates and inverters. Majority gates or other well-known gates may be used. As can be seen from an examination of these check bit equations $d_0$ appears in check bit equation $c_1$ and $c_6$. Likewise, data bit $d_{24}$ appears in check bit equations $c_5$ and $c_{10}$ only. Each data bit $d_0$....$d_{24}$ appears in two check bit equations. Accordingly, the decoder can be mechanized in accordance with these observations. In other words, the equations can be transformed into equations in which the common digit data is equated to the rest of the digit and check bit data in the equation. An example of an encoder mechanization for digit data $d_0$ and $d_{24}$ is given in FIG. 3. The four digit data bits $d_1$,...$d_4$ and the check bit $c_1$ are fed as inputs to a five input EXCLUSIVE OR gate 24. Likewise, the inputs $d_5$, $d_{10}$,$d_{15}$, $d_{20}$ and check bit $c_6$ are fed to a second five input EXCLUSIVE OR gate 26. It should be noted that none of these digit bits are the same either in the particular EXCLUSIVE OR gate or the associated EXCLUSIVE OR gate. Thus, actually the output of each EXCLUSIVE OR gate 24, 26 carries a determination or copy of $d_0$ data bit which is fed as a separate input to a threshold logic circuit 28. The original data bit $d_0$ is also fed directly as the third input to the threshold logic circuit 28. Since three inputs are present, all of which represent the data bit $d_0$, any single error with respect to either $d_0$ or one of the inputs to 24 or one of the inputs to 26 can be corrected by the operation of the threshold logic circuit 28. The threshold of the threshold logic circuit 28 is set such that it will give the value assumed by any two out of the three inputs. Thus, if one of the inputs is in error, the error is corrected. The output of the threshold logic or majority voter circuit 28, as it is sometimes called, is the original kbit $_0$ assuming that all the inputs to 28 are correct or at least two of the inputs to 28 are correct. There are a number of different ways known in the art for implementing majority gates, including transistor threshold circuits, resistor nets and so on. All of the original data digits $d_0$,...$d_{24}$ are generated in the same way and with the same circuitry as indicated in FIG. 3. 2

In order to expand this code to a double error correcting code, the "modularity" concept is introduced which simplifies the mechanization. In order to generate the necessary additional coding for the double error correction, 10 more check bits are necessary. This can be deduced from the $2mt$ characteristic of the code where $m$ was 5 and $t$, the number of errors correctable, is 2 thus giving us 20 check bits, 10 of which we already have derived in connection with the first error correction description above. These additional 10 equations are derived from the Latin squares $L_1$ and $L_2$ which are shown in FIG. 4. These Latin squares $L_1$ and $L_2$ are theoretically used as overlays on the original square array of the 25 data digits. The data bits corresponding to the same digits on the Latin square overlay are EXCLUSIVE OR'ed together to give the check bit equation as follows:

$$\left.\begin{array}{l} c_{11}=d_0\oplus d_9\oplus d_{13}\oplus d_{17}\oplus d_{21} \\ c_{12}=d_1\oplus d_5\oplus d_{14}\oplus d_{18}\oplus d_{22} \\ c_{13}=d_2\oplus d_6\oplus d_{10}\oplus d_{19}\oplus d_{23} \\ c_{14}=d_3\oplus d_7\oplus d_{11}\oplus d_{15}\oplus d_{24} \\ c_{15}=d_4\oplus d_8\oplus d_{12}\oplus d_{16}\oplus d_{20} \end{array}\right\}\text{Derived from } L_1$$

$$\left.\begin{array}{l} c_{16}=d_0\oplus d_8\oplus d_{11}\oplus d_{19}\oplus d_{22} \\ c_{17}=d_1\oplus d_9\oplus d_{12}\oplus d_{15}\oplus d_{23} \\ c_{18}=d_2\oplus d_5\oplus d_{13}\oplus d_{16}\oplus d_{24} \\ c_{19}=d_3\oplus d_6\oplus d_{14}\oplus d_{17}\oplus d_{20} \\ c_{20}=d_4\oplus d_7\oplus d_{10}\oplus d_{18}\oplus d_{21} \end{array}\right\}\text{Derived from } L_2$$

Figure 5:
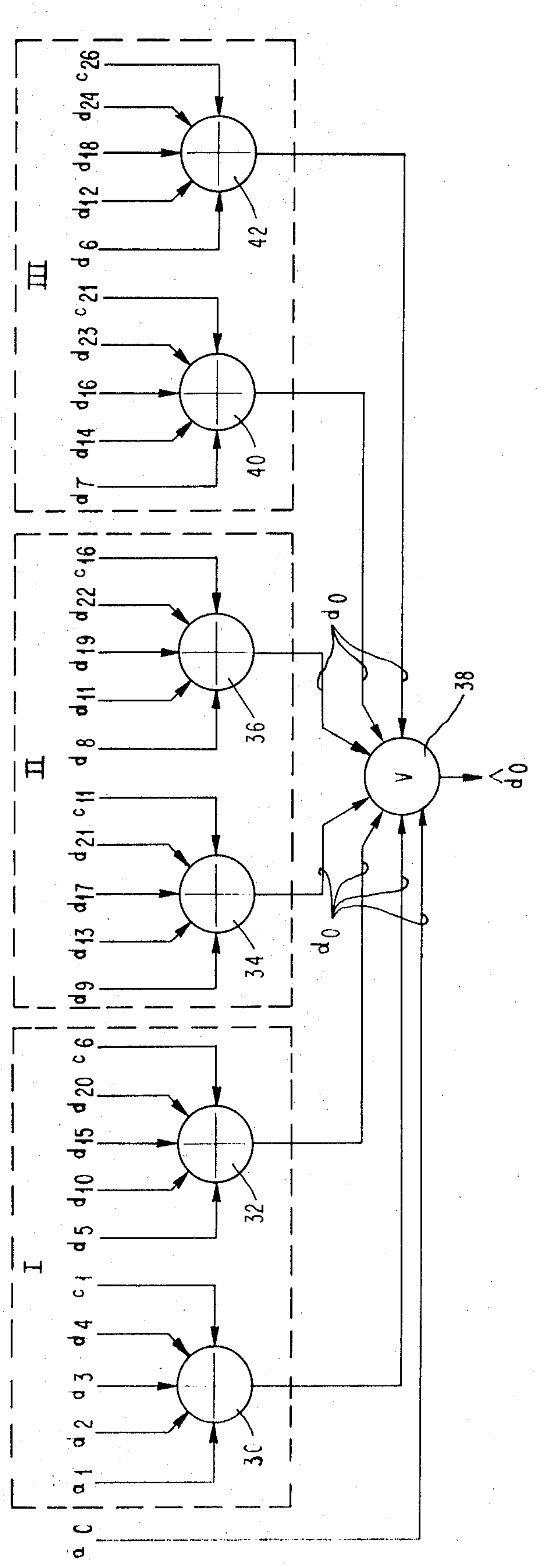
FIG. 5 is a schematic diagram showing a decoder for the $d_0$ data bit capable of correcting three errors and demonstrating the modular building concept.

These additional 10 check bit equations $c_{11}$...$c_{20}$ provide two additional independent means for determining each data bit. For example $d_0$ can now be obtained from the additional check bit equations $c_{11}$ and $c_{16}$. Thus, two additional copies of data bits $d_0$ can be derived and utilized as inputs to the threshold logic circuit. Thus, the majority voting can be a three out of five voting circuit where two of the inputs to the voter are those derived for the single error case and two are those derived by the additional check bit equations for the double error case. These four inputs along with the data bit itself, constitute the five inputs to the voter. The implementation of the first data bit $d_0$ is shown in FIG. 5. It will be appreciated that the first two EXCLUSIVE OR gates 30,32 and the inputs thereto as shown in the dotted block I corresponds to the decoder circuit of FIG. 2 for the single error correction case. EXCLUSIVE OR gates 34 and 36 having as inputs the terms of the equation derived from check bit equation $c_{11}$ and $c_{16}$ have been added to the single error correction case to obtain the double error correcting capability for digit data $d_0$. Accordingly, the output of the EXCLUSIVE OR circuits 34 and 36 is $d_0$. Thus, there are five inputs, one consisting of $d_0$ along with four additional determinations of $d_0$ connected as inputs to the majority voter circuit 38. It will be appreciated that the majority voter circuit 38 with five inputs is capable of correcting any two errors. In other words, the circuit is capable of responding with the correct $d_0$ output when any three of the inputs to gate 38 are correct, which is the case as long as two or fewer errors have occurred in the data and check bits. It should also be appreciated that the circuitry necessary for correcting the additional error, in other words, the second error can be added to the first error correction circuit as a modular arrangement (see box II, FIG. 5). This is important since it is not necessary to interfere with the mechanization of the original first error correction circuit. This introduces considerable flexibility into the circuit in that the circuitry can be built in modular form and easily packaged.

Extending the example to the triple error correction case, the modularity concept can be further exemplified by deriving additional check bit equations $c_{21}$, $c_{22}$...$c_{30}$ from Latin squares $L_3$ and $L_4$ shown in FIG. 4. The resulting check bit equations are as follows:

$$\left.\begin{array}{l} c_{21}=d_0\oplus d_7\oplus d_{14}\oplus d_{16}\oplus d_{23} \\ c_{22}=d_1\oplus d_8\oplus d_{10}\oplus d_{17}\oplus d_{24} \\ c_{23}=d_2\oplus d_9\oplus d_{11}\oplus d_{18}\oplus d_{20} \\ c_{24}=d_3\oplus d_5\oplus d_{12}\oplus d_{19}\oplus d_{21} \\ c_{25}=d_4\oplus d_6\oplus d_{13}\oplus d_{15}\oplus d_{22} \end{array}\right\}\text{From } L_3$$

$$\left.\begin{array}{l} c_{26}=d_0\oplus d_6\oplus d_{12}\oplus d_{18}\oplus d_{24} \\ c_{27}=d_1\oplus d_7\oplus d_{13}\oplus d_{19}\oplus d_{20} \\ c_{28}=d_2\oplus d_8\oplus d_{14}\oplus d_{15}\oplus d_{21} \\ c_{29}=d_3\oplus d_9\oplus d_{10}\oplus d_{16}\oplus d_{22} \\ c_{30}=d_4\oplus d_5\oplus d_{11}\oplus d_{17}\oplus d_{23} \end{array}\right\}\text{From } L_4$$

From the above check bit equations, it can be seen that there are now two additional means of determining each data bit. For example, $d_0$ can be derived from check bit equations $c_{21}$ and $c_{26}$. Thus error correction can be effected by four out of seven voting as exemplified in the circuit shown in FIG. 5 for $d_0$. Comparing block III of FIG. 5 with blocks I and II, it will be appreciated that EXCLUSIVE OR gates 40 and 42 have been added to the circuitry of FIG. 5 to obtain the two additional determinations of data bit $d_0$ thus making the sixth and seventh $d_0$ input to voting circuit 38. It will be appreciated that three of the inputs to the voting circuit 44 can be in error and the voter circuit will still produce the original $d_0$ output; thus three errors in the data and check bits can actually be corrected. The same theory and circuitry is needed for each of the 24 data bits. In summary, the dotted line block I corresponds to the circuitry for generating $d_0$ in FIG. 3, while dotted line block II contains the EXCLUSIVE OR gates that were added in FIG. 5 to obtain the double error correction.

The EXCLUSIVE OR gates in dotted line block III are those which were added to include the triple error correction. From the above, it can be seen that each increase in the number of errors $t$ that can be corrected requires two additional EXCLUSIVE OR gates. The number of errors that can be corrected is limited by the value $m$ according to the following equation:

$$t \leq \frac{m+1}{2}$$

It should also be taken into consideration that a practical limit is reached wherein the additional circuitry is not warranted in view of the possibility of that many errors occurring simultaneously.

In FIG. 5 it has been illustrated that module I provides single error correction, modules I and II double error correction and the addition of module III provides triple error correction. It will be appreciated that each module is identical. Accordingly any one of the three modules can actually be used for single error correction, any two for double error correction etc. Actually the modularity extends to the level of the EXCLUSIVE OR circuit within the modules. For example, single error correction can be obtained by using any two EXCLUSIVE OR circuits such as 30 and 42 shown in FIG. 5. Similarly, multiple error correction can be obtained by utilizing any two EXCLUSIVE OR circuits for each succeeding error correcting capability. The module construction is extremely important in packaging integrated circuits.

Figure 6:
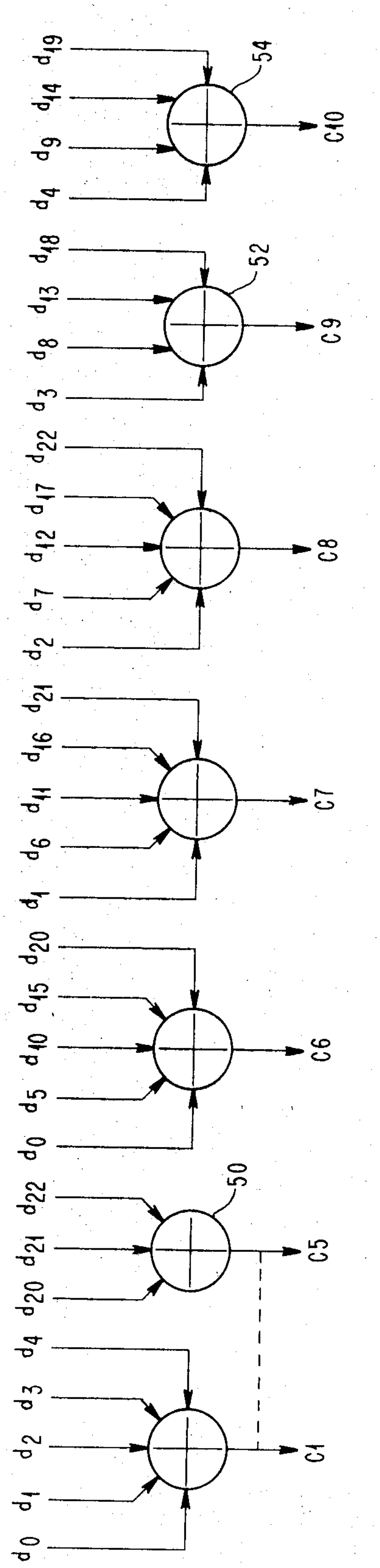
FIG. 6 is a schematic diagram showing an encoder of data length 23.
Figure 7:
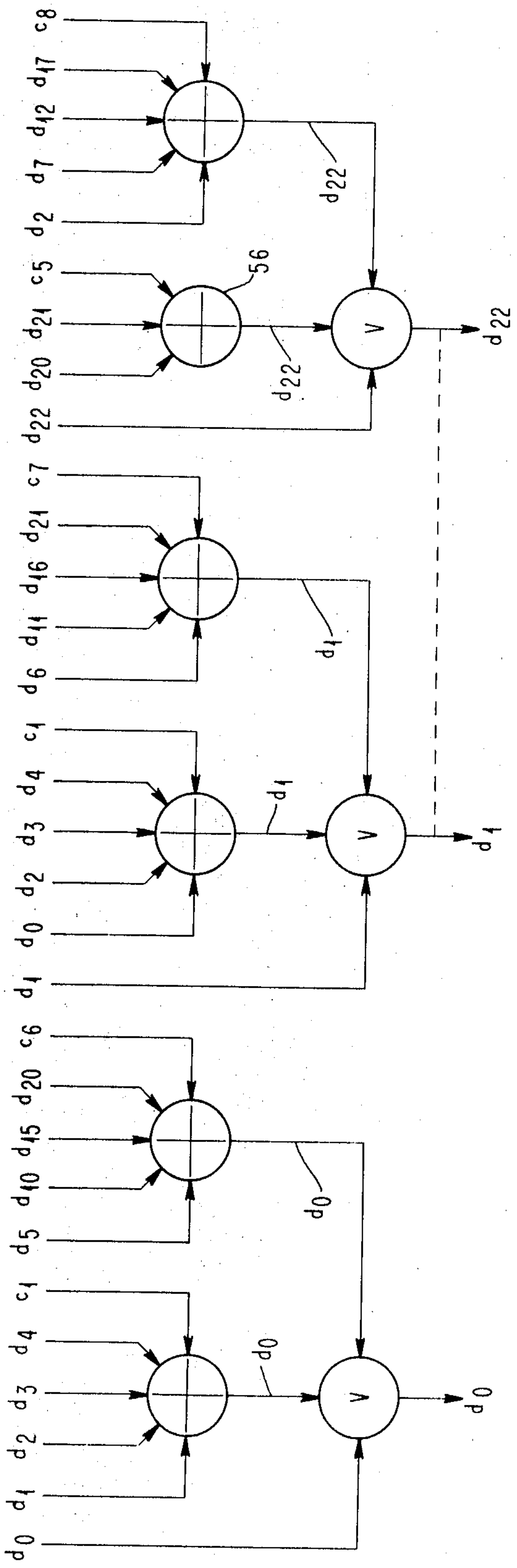
FIG. 7 is a schematic diagram showing a decoder of data length 23.

A message of $k$ data bits less than $m^2$ can be encoded and decoded in exactly the same way as the $m^2$ data bits. An example of an encoder and decoder for 23 data bits are shown in FIGS. 6 and 7 respectively. The check bit equations are derived by expanding the data bits of the code to the next greater square. In the case of the 23 data bit code the next greater square is 25. The code and mechanization can be subsequently shortened by eliminating the extra data bits. For example, in the 23 data bit encoder of FIG. 6, the inputs for data bits 23 and 24 have been eliminated. Actually, any two data bits could have been eliminated. Referring back to the row and column equations for check bits $c_1$ through $c_{10}$ derived in the description for the 25 data bit example, it can be seen that data bits $d_{23}$ and $d_{24}$ appear in check bit equation $c_5$, data bit $d_{23}$ in check bit equation $c_9$ and $d_{24}$ in $c_{10}$. Accordingly, the encoder, shown in FIG. 6, for generating the check bits $c_1$ through $c_{10}$ has only three inputs to EXCLUSIVE OR circuit 50 for generating check bit $c_5$ and four inputs to EXCLUSIVE OR circuits 52 and 54 for generating check bits $c_9$ and $c_{10}$, respectively. The linear logic or parity check circuits which essentially translate the check bit equations into the corresponding common data bit will accordingly have fewer inputs. For example, data bit $d_{22}$ appears in both check bit equations $c_5$ and $c_8$. Accordingly EXCLUSIVE OR gate 56 in FIG. 7 will have only three inputs. Actually the regular five input circuit can be utilized with the unused inputs forced to produce a fixed signal such as "0."

It will be appreciated that the decoder except for the voting circuit can be utilized to detect errors. The linear logic circuit performs a parity check function by means of which error detection can be obtained. An additional error detecting capability can be included by adding an overall parity checking circuit. This circuit would check the parity of the entire message, rather than the groups of $m$ data bits as is done by the linear logic parity checking circuitry previously described.

While the invention has been particularly shown and described with reference to one code, it will be understood by those skilled in the art that various changes in form and detail may be made therein without departing from the spirit and scope of the invention.

What we claim is:

1. A multiple random error correcting system for correcting messages of $k(\leq m^2)$ data bits where $m$ is an integer greater than 2 comprising:

encoding means for adding $2m$ check bits to said data bits for each of a plurality of error correcting capabilities to generate $2mt$ check bits for $t$ error correcting capabilities; and decoding means including an error correcting circuit for each of said data bits and a linear logic circuit module for each error correcting capability for performing parity checks for each data bit, the outputs of each linear logic circuit module forming inputs to said error correcting circuit.

2. A system in accordance with claim 1, wherein each linear logic circuit module includes two EXCLUSIVE OR circuits each having $m$ input terminals to which are applied $m-1$ data bit inputs and a check bit input.

3. A system in accordance with claim 2, wherein any two of said EXCLUSIVE OR circuits from any combination of said linear logic circuit modules are interchangeable to produce an output representative of the same data bit.

4. A system in accordance with claim 1, wherein said error correcting circuit comprises a threshold logic circuit for each of said data bits where the threshold has been fixed so as to produce an output signal representative of the outputs of the associated linear logic circuit modules forming data bits if the majority of the data bit inputs thereto are the same.

5. A system in accordance with claim 4, wherein each threshold logic circuit contains an additional input for a signal representative of the data bit itself which the respective threshold logic circuit is correcting.

6. A system in accordance with claim 1, wherein said encoding means includes $2m$ EXCLUSIVE OR circuits for each error correcting capability each EXCLUSIVE OR circuit having $m$ inputs for receiving different combinations of said $k$ data bits, pairs of said $2m$ EXCLUSIVE OR circuits having a common data bit input and having no other data bit in common, the output from each of said EXCLUSIVE OR circuits representing a different one of said $2m$ check bits.

7. A system in accordance with claim 6, wherein said different combinations of said $m^2$ data bits applied to the inputs of each EXCLUSIVE OR circuit are determined in accordance with the orthogonality of a pair of orthogonal Latin squares for each error correcting capability.

8. A system in accordance with claim 7, wherein said different combinations of said $k$ data bits for each EXCLUSIVE OR circuit for the first error correcting capability are obtained by applying the data bits in each row and each column of a basic square array of the data to inputs of respective EXCLUSIVE OR circuits.

9. A system in accordance with claim 8, wherein said different combinations of said $k$ data bits for each EXCLUSIVE OR circuit for the second and succeeding error correcting capabilities are obtained by applying those data bits to the inputs of respective EXCLUSIVE OR circuits which correspond in position in said basic square array of data to the position of digits which are the same in each of a pair of orthogonal Latin squares for each error correcting capability.

10. A method for correcting multiple random errors in a data processing system parallel bit message of $k(\leq m^2)$ data bits where $m$ is an integer $> 2$ comprising the steps of:

generating $2mt$ check bits simultaneously for said message from predetermined groups of said message bits where $t$ is equal to the number of errors that can be corrected, each data bit appearing in exactly $2t$ of these $2mt$ groups, each $2t$ of these groups contains a common data bit and has no other data bits in common, said grouping of said bit message being formed in accordance with the orthogonality of orthogonal Latin squares for the integer $m$;

generating a first redundant bit for each common data bit appearing in $2t$ of the $2mt$ groups; and generating a further redundant bit when the majority of said first redundant bits and said common data bit agree, thereby correcting up to $t$ errors.

11. A method according to claim 13, wherein a check bit is added to said message for each row and each column of a basic square array of said $m^2$ data bits for the first error correcting capability.

12. A method according to claim 11, wherein said $2mt$ check bit output equations are formed for two or more error correcting capabilities by adding a check bit for each group of data bits in said basic square array which correspond in position to similar digits in each of a pair of orthogonal Latin squares for $k$ data bits, a further pair of orthogonal Latin squares are used for each successive error correcting capability.